US012692912B2

(12) United States Patent
Matsuoka et al.

(10) Patent No.: US 12,692,912 B2
(45) Date of Patent: Jul. 28, 2026

(54) TORQUE HINGE WITH CLUTCH MECHANISM

(71) Applicant: Origin Company, Limited, Saitama (JP)

(72) Inventors: Takahiro Matsuoka, Saitama (JP); Masayuki Hirata, Saitama (JP)

(73) Assignee: ORIGIN COMPANY, LIMITED, Saitama (JP)

( * ) Notice: Subject to any disclaimer, the term of this patent is extended or adjusted under 35 U.S.C. 154(b) by 285 days.

(21) Appl. No.: 18/563,591

(22) PCT Filed: Mar. 28, 2022

(86) PCT No.: PCT/JP2022/014931
§ 371 (c)(1),
(2) Date: Nov. 22, 2023

(87) PCT Pub. No.: WO2022/254916
PCT Pub. Date: Dec. 8, 2022

(65) Prior Publication Data
US 2024/0218907 A1     Jul. 4, 2024

(30) Foreign Application Priority Data

Jun. 2, 2021     (JP) ................................. 2021-092917

(51) Int. Cl.
*F16D 41/02*     (2006.01)
*F16D 41/20*     (2006.01)

(52) U.S. Cl.
CPC ........... *F16D 41/02* (2013.01); *F16D 41/206* (2013.01)

(58) Field of Classification Search
CPC ........ F16D 41/02; F16D 41/206; F16D 43/20; F16D 43/21
See application file for complete search history.

(56) References Cited

U.S. PATENT DOCUMENTS 1,985,387 A * 12/1934 William ................ F16D 41/206
                                                192/41 S
3,033,336 A * 5/1962 Kinsman ............... F16D 41/206
                                                192/81 C
(Continued)

FOREIGN PATENT DOCUMENTS

JP          7-310767        11/1995
JP          9-112568         5/1997
(Continued)

OTHER PUBLICATIONS

International Search Report (ISR) issued Jun. 14, 2022 in International (PCT) Application No. PCT/JP2022/014931.
(Continued)

*Primary Examiner* — Huan Le
(74) *Attorney, Agent, or Firm* — Wenderoth, Lind & Ponack, L.L.P.

(57)          ABSTRACT

A torque hinge is such that a driven-side member can be rotated with respect to a driving-side member with a sufficiently small force even if inner and outer rings are connected by a frictional force applied by a connection member. Coil springs each having a pair of hook portions are mounted on the outer peripheral surface of the outer ring, which is supported by a cylindrical support member. Further, a control member for controlling the coil springs is in series in the axial direction on the support member, and the control member allows rotation about a common rotation axis of the inner and outer rings with respect to the support member. The support member and the control member are provided with hook grooves into which the hook portions of the coil springs are respectively fitted. The coil springs retain or liberate the outer ring by a required operation.

8 Claims, 11 Drawing Sheets

(56)                References Cited

U.S. PATENT DOCUMENTS

|  |  |  |  |  |
|---|---|---|---|---|
| 3,450,365 | A | 6/1969 | Kaplan | |
| 9,140,319 | B2 * | 9/2015 | Williams | ................... F16D 3/12 |
| 9,441,677 | B2 * | 9/2016 | Williams | ................ F16D 13/76 |
| 2010/0108454 | A1 | 5/2010 | Takada et al. | |

FOREIGN PATENT DOCUMENTS

| | | |
|---|---|---|
| JP | 9-166153 | 6/1997 |
| JP | 2001-12514 | 1/2001 |
| JP | 2001-208108 | 8/2001 |
| JP | 2002-147499 | 5/2002 |
| JP | 2003-65355 | 3/2003 |
| JP | 2007-10118 | 1/2007 |
| JP | 2012-229747 | 11/2012 |
| JP | 2012-229810 | 11/2012 |
| JP | 2018-35837 | 3/2018 |
| JP | 6801149 | 12/2020 |
| JP | 2021-14861 | 2/2021 |

OTHER PUBLICATIONS

Extended European Search Report issued Aug. 1, 2024 in corresponding European Patent Application No. 22815673.3.

* cited by examiner

A-A CROSS SECTION

A-A CROSS SECTION

A-A CROSS SECTION

ENLARGED VIEW
OF B-PART

A-A CROSS SECTION

A-A CROSS SECTION

A-A CROSS SECTION

A-A CROSS SECTION

A-A CROSS SECTION

B-B CROSS SECTION

TORQUE HINGE WITH CLUTCH MECHANISM

TECHNICAL FIELD

The present invention relates to a torque hinge. More specifically, the present invention relates to a torque hinge equipped with a clutch mechanism capable of switching between a state in which two members to connected to both the sides connected to both the sides are rotated integrally or relatively against a required frictional force by performing a required operation, and a state in which the members are relatively rotated without depending on a required frictional force.

BACKGROUND ART

Conventionally, for instance, torque hinges have been widely put into practical use to suspend an LCD display of a notebook computer or a cover of a copying machine at a position of any tilt angle with respect to the main unit. Patent Documents 1 and 2 below disclose an example of torque hinge having an inner ring and an outer ring that have a common rotation axis and a connection member that is disposed between the inner ring and the outer ring so as to disconnectably connect the rings by a required frictional force. Patent Documents 1 and 2 refer to a so-called frictional torque hinge, where a spring member composed of a metal thin plate is employed as the connection member. The spring member has a spring portion to get close contact with the outer peripheral surface of the inner ring so as to generate the required frictional force. The inner ring and the outer ring are relatively rotatable against the required frictional force applied by the spring member.

For instance, Patent Document 3 discloses a bidirectional torque limiter utilizing a coil spring. Patent Document 4 discloses a bidirectional torque limiter utilizing a so-called ring spring, and Patent Document 5 discloses a bidirectional torque limiter utilizing a so-called tolerance ring. Since the inner ring and outer ring are relatively rotatable against the required frictional force even in the bidirectional torque limiter disclosed in Patent Documents 3 to 5, these torque limiters achieve the same effect as a torque hinge.

As described above, the torque hinge may be used as an angle retaining device for suspending a cover at a position of any tilt angle with respect to the main unit, and it may be used also as a rotation transmitter by connecting either the inner ring or the outer ring to the driving-side member and connecting the other ring to the driven-side member. For instance, either the inner ring or the outer ring is connected to an electric motor as a driving-side member while the other ring is connected to a door of a vehicle as a driven-side member, so that the door can be opened and closed by the electric motor. The door may be subjected suddenly to an external force by wind or the like when the door is in an opening/closing operation by the driving torque of the electric motor or when the door is retained at the full-open position or the intermediate open position by the detent torque or the retaining torque of the electric motor. In such a case, the external force applied to the door can be released by the relative rotation of the inner ring and the outer ring, thereby preventing flapping of the door.

PRIOR ART DOCUMENTS

Patent Documents

[Patent Document 1] JP 2001-12514 A
[Patent Document 2] JP 2003-65355 A

[Patent Document 3] JP H09-112568 A
[Patent Document 4] JP 2018-35837 A
[Patent Document 5] JP 2021-14861 A

SUMMARY OF THE INVENTION

Problem to be Solved by the Invention

In a case where the torque hinge (bidirectional torque limiter) disclosed in any of Patent Documents 1 to 5 is used as a rotation transmitter, either the inner ring or the outer ring is always connected to the electric motor while the other ring is always connected to the door. As a result, for instance, in a case where there occurs a necessity of opening/closing the door manually due to a failure or the like of the electric motor, the user is required to open/close the door against the so-called required frictional force for the connection member to connect the inner ring and the outer ring or against the detent torque or a retaining torque of the electric motor. In this case, opening and closing the door requires considerable force, making it substantially impossible.

The present invention has been made in view of the above-described fact, and a main technical object thereof is to provide a novel and improved torque hinge capable of switching between a state for rotating two members integrally or relatively against a required frictional force by performing a required operation, and a state for relatively rotating the members without depending on the required frictional force.

Means for Solving the Problems

As a result of intensive studies, the present inventors have found that the main technical problems can be solved by the following manner. In the structure, specifically, coil springs each having a pair of hook portions are mounted on the outer peripheral surface of an outer ring, and the outer ring is supported by a cylindrical support member. At the same time, a control member for controlling the coil springs is assembled in series in an axial direction with the support member so that the control member is rotatable about a common rotation axis of the inner ring and the outer ring with respect to the support member. The support member and the control member have hook grooves into which each of the pair of hook portions of the coil spring can be fitted, and the coil springs may retain or liberate the outer ring by a required operation.

That is, the present invention provides, as a torque hinge for achieving the main technical objects described above, a torque hinge characterized in that it includes an inner ring and an outer ring that have a common rotation axis, and a connection member disposed between the inner ring and the outer ring so as to connect disconnectably the inner ring and the outer ring by a required frictional force, the inner ring and the outer ring are rotatable integrally or relatively against the required frictional force, the outer ring is inserted into a cylindrical support member so as to be supported by the support member, and coil springs having a pair of hook portions are mounted on the outer peripheral surface of the outer ring, a control member for controlling the coil springs is assembled in series in an axial direction with the support member, the control member is rotatable about the common rotation axis with respect to the support member, and the support member and the control member each has hook grooves into which each of the pair of hook portions of the coil spring is to be fitted, and the coil springs retain or liberate the outer ring by a required operation.

Preferably, both the coil springs and the control member are arranged one on each axial side of the support member, the support member is assembled with a bevel gear that is rotatable about a support shaft perpendicular to the common rotation axis, and the control member is equipped with arcuate racks extending in the circumferential direction to mesh with the bevel gear. It is preferable in this case that the coil springs arranged at the axial both sides of the support member are composed of wires that are wound in directions opposite to each other when viewed from one axial end. Further it is favorable that the control member has a cylindrical support protrusion to enter between the inner peripheral surface of the outer ring and the outer peripheral surface of the inner ring, and the connection member is supported from the axial both sides by the respective support protrusions of the control members arranged on the axial both sides of the support member. Suitably, the coil springs tighten and retain the outer ring in a state in which the coil springs are mounted on the outer peripheral surface of the outer ring and no force is applied to each of the pair of hook portions, and the control member rotates with respect to the support member so that the coil springs liberate the outer ring. Preferably, the connection member is non-rotatable with respect to the outer ring. In this case, it is suitable that the connection member is retained from the axial both sides by a pair of retainers, and each of the pair of retainers is locked with the outer ring in the circumferential direction by a circumferential locking means. Further, it is favorable that the connection member is a spring member composed of a metal thin plate having spring portions to be in close contact with the outer peripheral surface of the inner ring.

Effect of the Invention

In the torque hinge of the present invention, a pair of hook portions of each of the coil springs mounted on the outer peripheral surface of the outer ring are respectively fitted into the hook grooves formed on a support member for supporting the outer ring and a control member to be assembled in series in the axial direction with the support member. Since the control member is rotatable about the common rotation axis of the inner ring and the outer ring with respect to the support member, it is possible to switch between a state in which the coil springs tighten to retain the outer ring and a state in which the coil springs liberate the outer ring, by relatively rotating the support member and the control member about the common rotation axis.

In a state in which the coil springs tighten and retain the outer ring, the support member is integrated with the outer ring. As a result, the inner ring connected to the outer ring by the required frictional force applied by the connection member becomes rotatable integrally with the support member or relatively against the required frictional force. On the other hand, in a state in which the coil springs liberate the outer ring, the support member is disconnected from the outer ring and becomes rotatable with a sufficiently small force with respect to the outer ring, and the inner ring also becomes rotatable with a sufficiently small force with respect to the support member. In other words, in the torque hinge of the present invention, it is possible to switch between a state for rotating two members connected to both the sides integrally or relatively against the required frictional force by performing the required operation; and a state for relatively rotating the members with a sufficiently small force without depending on a required frictional force. Therefore, if the torque hinge of the present invention is assembled as a rotation transmitter in a door of a vehicle for instance, and the inner ring and the support member are connected to the electric motor and to the door respectively, the electric motor is capable of opening and closing the door against the required frictional force applied by the connection member in a state in which the coil springs retain the outer ring. The door may be subjected suddenly to an external force by wind or the like when the door is in an opening/closing operation by the driving torque of the electric motor or when the door is retained at the full-open position or the intermediate open position by the detent torque or the retaining torque of the electric motor. In such a case, the external force applied to the door can be released by the relative rotation of the inner ring and the outer ring, thereby preventing flapping of the door. On the other hand, in a state in which the coil springs liberate the outer ring, the door can be opened and closed with a sufficient small force even if the inner ring is connected to the electric motor.

MODE FOR CARRYING OUT THE INVENTION

A further detailed explanation will be made below with reference to the accompanying drawings that show a preferred embodiment of a torque hinge configured in accordance with the present invention.

The following explanation will be made by referring to FIGS. 1 to 5, mainly FIGS. 3 to 5. A torque hinge denoted generally as numeral 2 has an inner ring 4 and outer ring 6 that have a common rotation axis o1, and a connection member 8.

Figure 5:
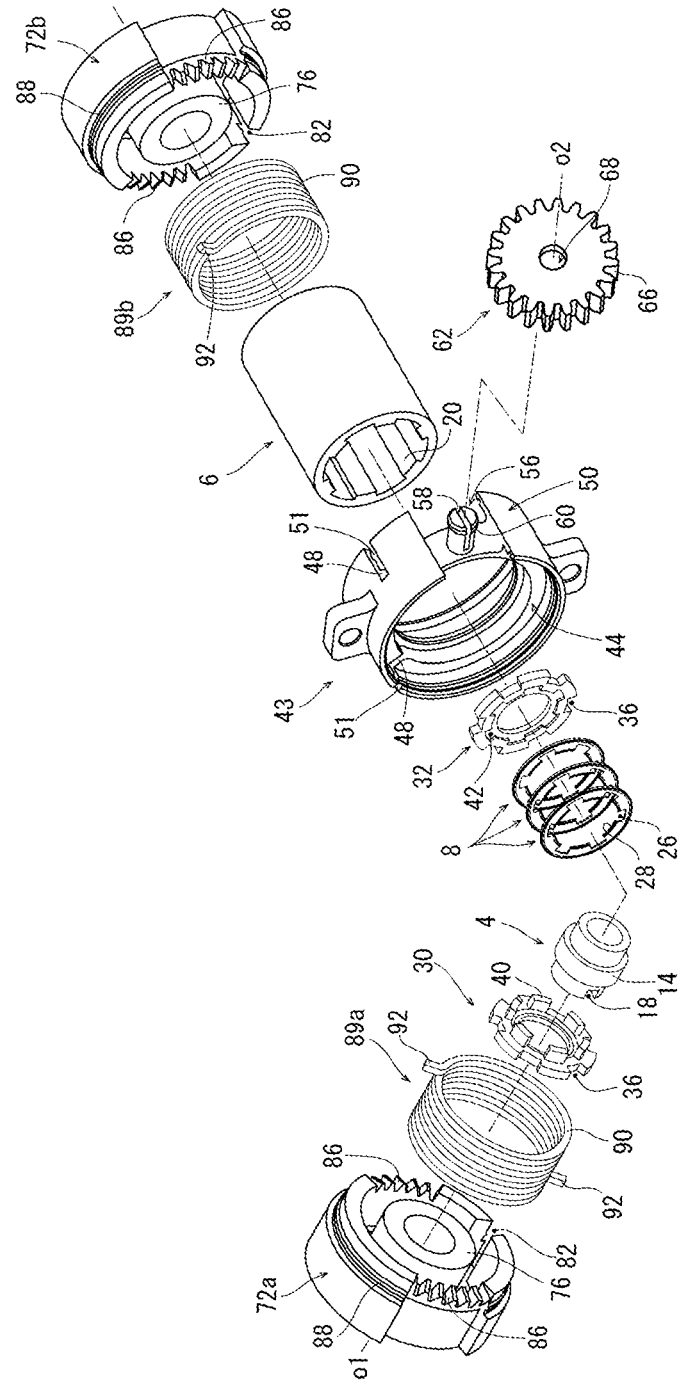
FIG. 5 is a perspective exploded view showing the respective components of the torque hinge shown in FIG. 1.
Figure 6:
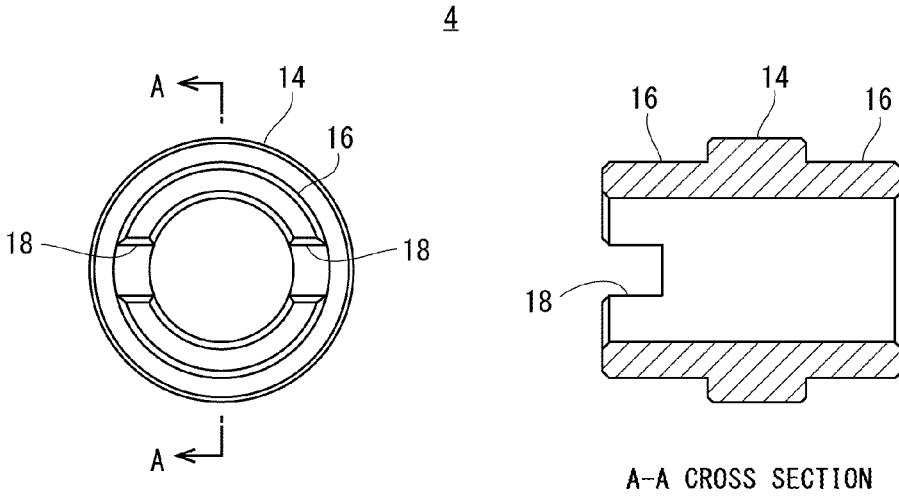
FIG. 6 shows separately an inner ring of the torque hinge shown in FIG. 1.

The following explanation will be made by referring to FIGS. 3 to 5 and also FIG. 6. The inner ring 4 is made of metal and it has a substantially cylindrical shape. The axial central portion of the inner ring 4 is provided with a working portion 14 having a peripheral surface with a circular cross section and a comparatively large diameter. At the axial both sides of the working portion 14, inner ring shaft portions 16 each having a comparatively small diameter and a peripheral surface with a circular cross section are provided. At the axial free end parts of one of the two inner ring shaft portions 16, U-shaped notches 18 are formed. The notches 18 are formed at the diametrical both sides of the inner ring shaft portion 16. The inner ring 4 may be connected via the notches 18 to the shaft member s at the driving side shown by a two-dot chain line in FIGS. 3 and 4 or the like.

Figure 7:
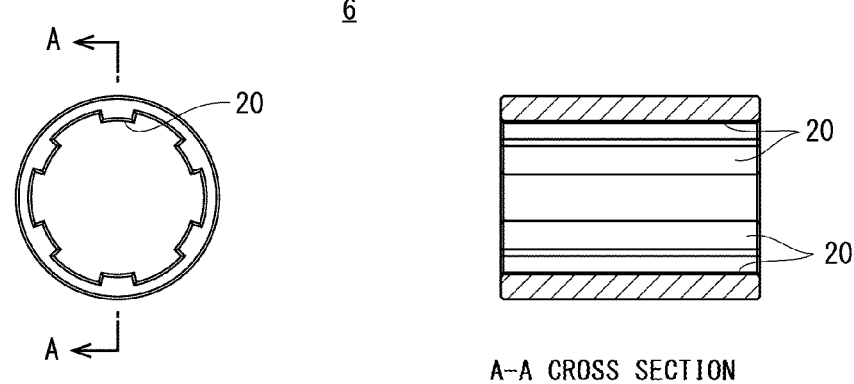
FIG. 7 shows separately an outer ring of the torque hinge shown in FIG. 1.

The following explanation will be made by referring to FIGS. 3 to 5 and also FIG. 7. The outer ring 6 is made of metal and it has a substantially cylindrical shape. As can be understood by referring to FIGS. 3 and 4, the inner diameter of the outer ring 6 is larger than the outer diameter of the working portion 14 of the inner ring 4, and the outer ring 6 is disposed outside the inner ring 4 in a state including the inner ring 4. While the cross-sectional shape of the outer peripheral surface of the outer ring 6 is circular, six circumferential locking ridges 20 are provided circumferentially at equal angular intervals on the inner peripheral surface, and the circumferential locking ridges 20 are formed by locally reducing the inner diameter. The circumferential locking ridges 20 extend linearly in the axial direction over the outer ring 6, and its cross-sectional shape is substantially rectangular.

Figure 3:
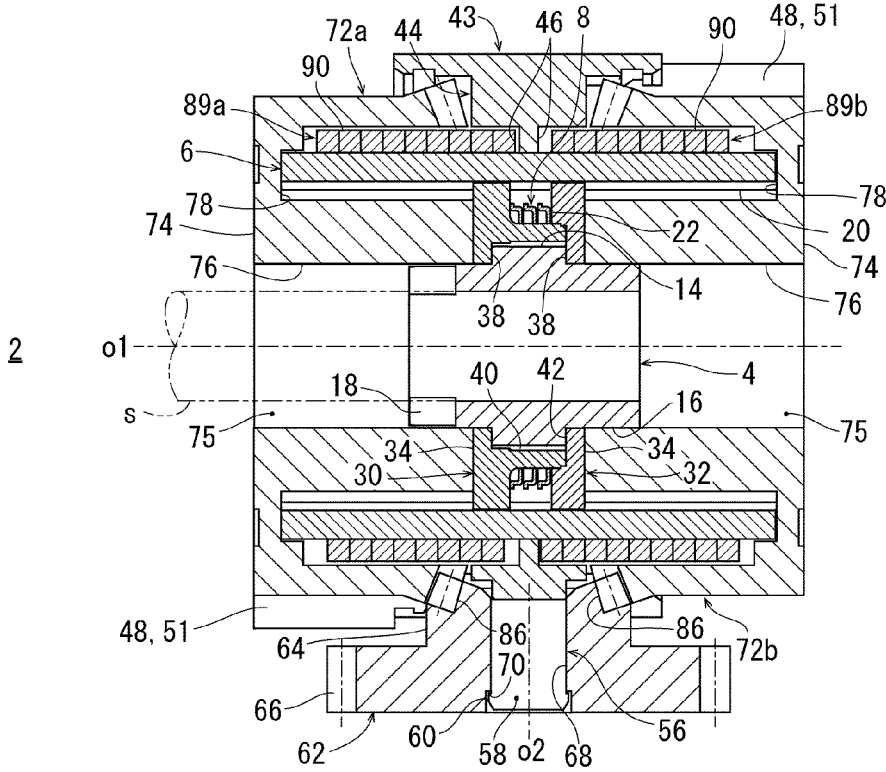
FIG. 3 is a cross-sectional view of the torque hinge shown in FIG. 1, taken along a section line A-A in FIG. 1.
Figure 4:
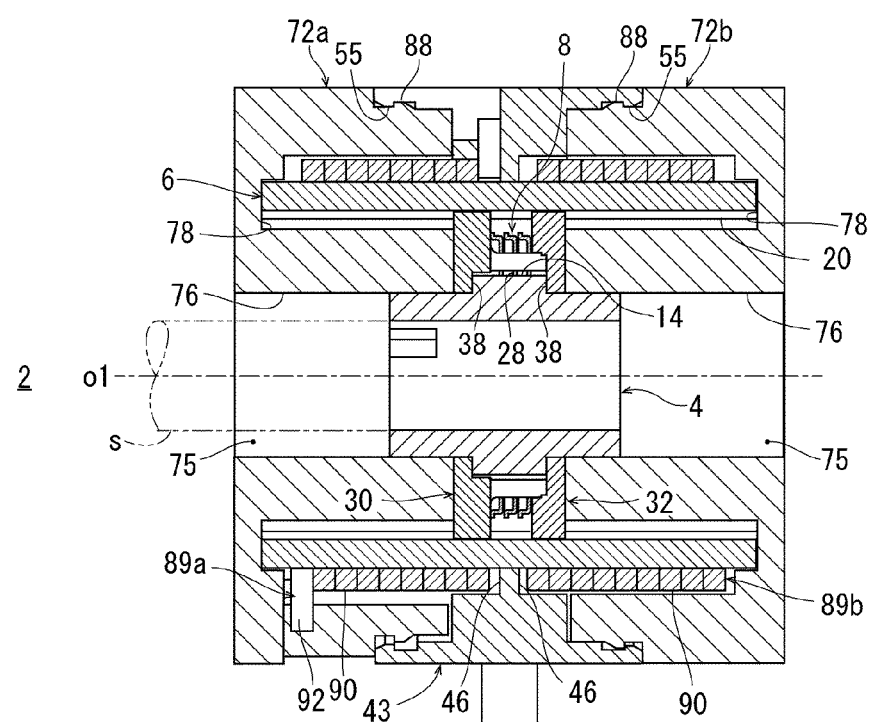
FIG. 4 is a cross-sectional view of the torque hinge shown in FIG. 1, taken along a section line B-B in FIG. 2.
Figure 8:
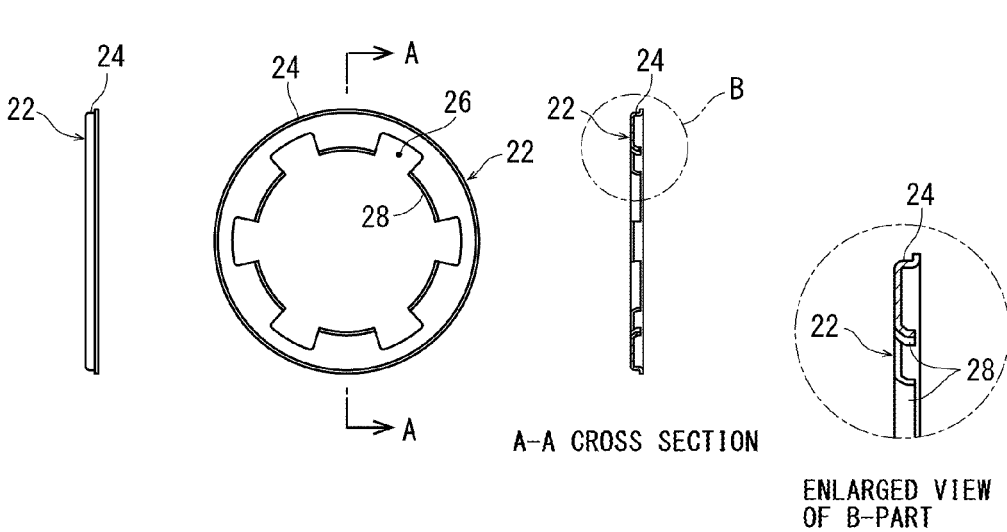
FIG. 8 shows separately a connection member of the torque hinge shown in FIG. 1.

As shown in FIGS. 3 and 4, the connection member 8 is disposed between the inner ring 4 and the outer ring 6, and more specifically between the outer peripheral surface of the inner ring 4 and the inner peripheral surface of the outer ring 6. The following explanation will be made by referring to FIGS. 3 to 5 and also FIG. 8. In the illustrated embodiment, the connection member 8 is made of metal, and it has a connection base portion 22 shaped as a substantially annular thin plate. As shown in FIGS. 3 and 4, the connection base portion 22 is disposed perpendicularly to the common rotation axis o1 by surrounding the outer peripheral surface of the inner ring 4. The outer peripheral edge of the connection base portion 22 is provided with an annularly-shaped outer peripheral reinforcing portion 24 that stands in the axial direction and bends radially outward. At the inner peripheral edge portion of the connection base portion 22, six engaging recesses 26 that are substantially rectangular are formed at equal angular intervals in the circumferential direction. The engaging recesses 26 are formed by locally increasing the inner diameter of the connection base portion 22. The inner peripheral edge of the angular region at the connection base portion 22, where the engaging recesses 26 are not formed, are bent in the axial direction to form spring portions 28. As shown in FIG. 4, the spring portions 28 elastically come into close contact with the outer peripheral surface of the working portion 14 of the inner ring 4. As will be understood by referring to the enlarged view of the portion B of FIG. 8, the spring portions 28 are bent to the same side as the outer peripheral reinforcing portion 24 in the axial direction.

Figure 2:
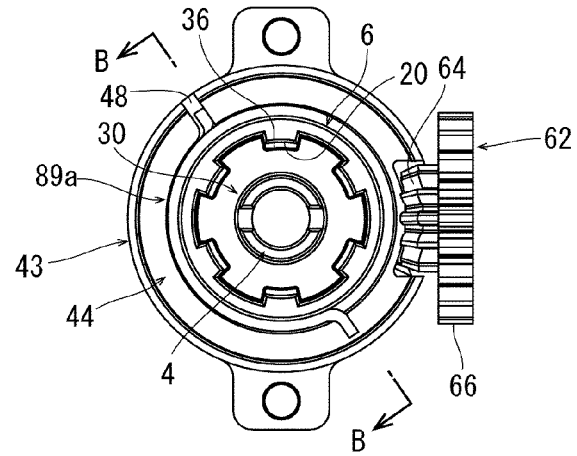
FIG. 2 is a left side view of the torque hinge shown in FIG. 1 from which a control member is dismounted.
Figure 9A:
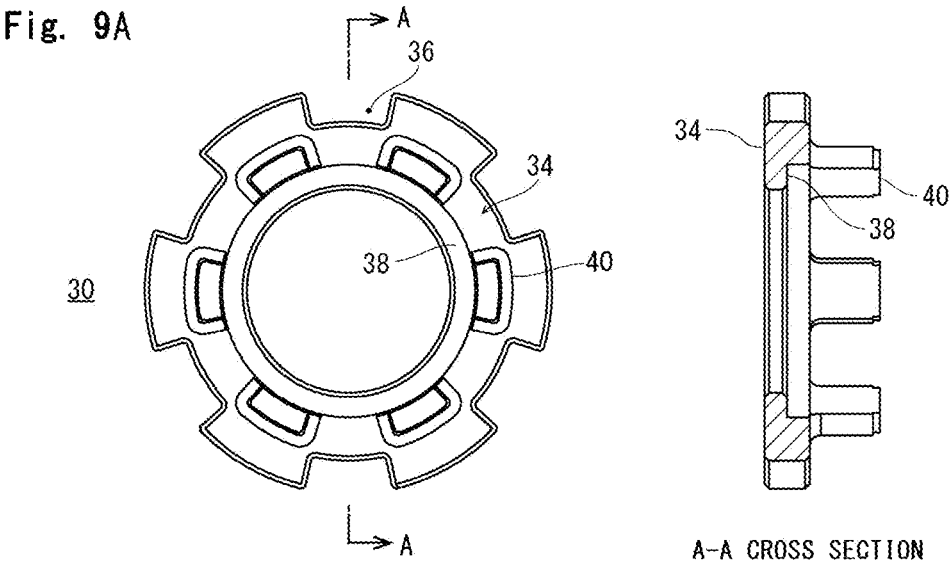
FIGS. 9A and 9B show separately retainers of the torque hinge shown in FIG. 1.
Figure 9B:
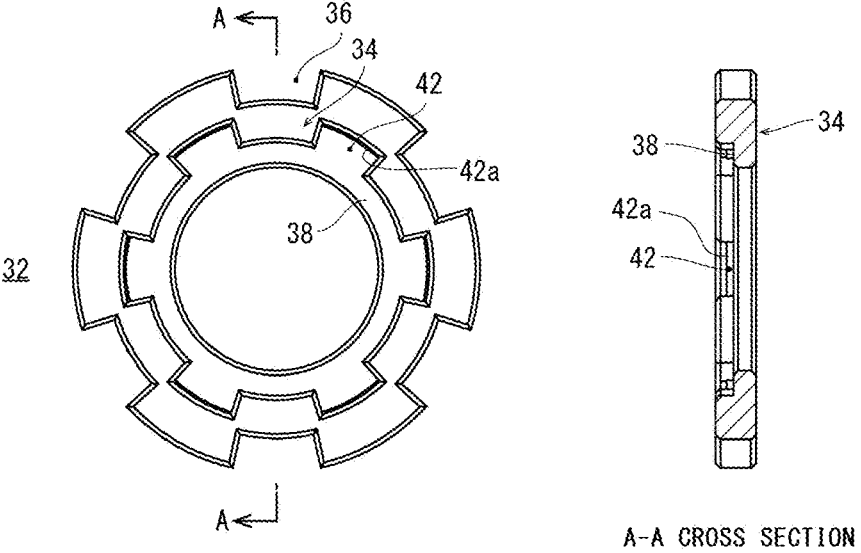

The aforementioned connection member 8 connects disconnectably the inner ring 4 and the outer ring 6 by the required frictional force. In the illustrated embodiment, the connection member 8 is retained from the axial both sides by a pair of retainers 30 and 32 made of a synthetic resin, and each of the pair of retainers 30 and 32 is locked to the outer ring 6 in the circumferential direction by the circumferential locking means described later. That is, the connection member 8 is assembled with the outer ring 6 in a non-rotatable manner with respect to the outer ring 6. The following explanation will be made by referring also to FIGS. 9A and 9B. The pair of retainers 30 and 32 are of mutually corresponding shape and both have retainer base portions 34 each shaped as an annular plate. As shown in FIGS. 3 and 4, the retainer base portions 34 also are disposed perpendicular to the common rotation axis o1, surrounding the outer peripheral surface of the inner ring 4. At the outer peripheral edge portion of a retainer base portion 34, six circumferential locking recesses 36 of a substantially rectangular shape are provided at equal angular intervals in the circumferential direction. The circumferential locking recesses 36 are formed by locally reducing the outer diameter of the retainer base portion 34. As shown in FIG. 2, the circumferential locking recesses 36 correspond to the circumferential locking ridges 20 formed on the outer ring 6, thereby constituting the circumferential locking means as described above. On the retainer base portion 34, an inner ring axial bearing surface 38 of annular shape is formed by reducing the axial width along the inner peripheral edge. As shown in FIGS. 3 and 4, the inner ring axial bearing surface 38 supports in the axial direction the working portion 14 of the inner ring 4. In the retainer base portion 34 of the retainer 30, six engaging convex columns 40 extending linearly in the axial direction are provided at equal angular intervals in the circumferential direction along the outer peripheral edge of the inner ring axial bearing surface 38. In the retainer base portion 34 of the retainer 32, six engaging depressions 42, which are depressed in the axial direction, are provided at equal angular intervals in the circumferential direction along the outer peripheral edge of the inner ring axial bearing surface 38. Further, the engaging depressions 42 are provided with minute stepped portions 42a extending continuously in the circumferential direction along the outer peripheral edge. The respective cross-sectional shapes of the engaging convex columns 40, the engaging depressions 42 and the engaging recesses 26 (formed in the connection member 8) correspond to each other.

In the illustrated embodiment, a plurality of the connection members 8 (three in the illustrated embodiment) are disposed by stacking in series in the axial direction. The circumferential angular positions of the respective engaging recesses 26 of the plurality of connection members 8 and the circumferential angular positions of the respective spring portions 28 are matched with each other. The pair of retainers 30 and 32 are disposed on the axial both sides of the entire plurality of connection members 8 disposed by stacking in series in the axial direction. The tip portions of the engaging convex columns 40 of the retainer 30 are fitted into the engaging depressions 42 of the retainer 32 after passing through the engaging recesses 26 of the connection members 8 in the axial direction. In this manner, the plurality of connection members 8 disposed by stacking in series in the axial direction are entirely retained from the axial both sides by the pair of retainer 30 and retainer 32. The thus assembled connection members 8 and the pair of retainers 30 and 32 are advanced into the outer ring 6 after matching the circumferential locking recesses 36 formed on the pair of retainers 30 and 32 and the circumferential locking ridges 20 formed on the inner peripheral surface of the outer ring 6 (see also FIG. 2). In this manner, the connection members 8 are mounted in a non-rotatable manner with respect to the outer ring 6 via the pair of retainers 30 and 32. If desired, by forming circumferential locking recesses on the outer peripheral surfaces of the connection members 8, it is also possible to mount directly the connection members on the inner peripheral surface of the outer ring 6 without using the pair of retainers 30 and 32.

Figure 10:
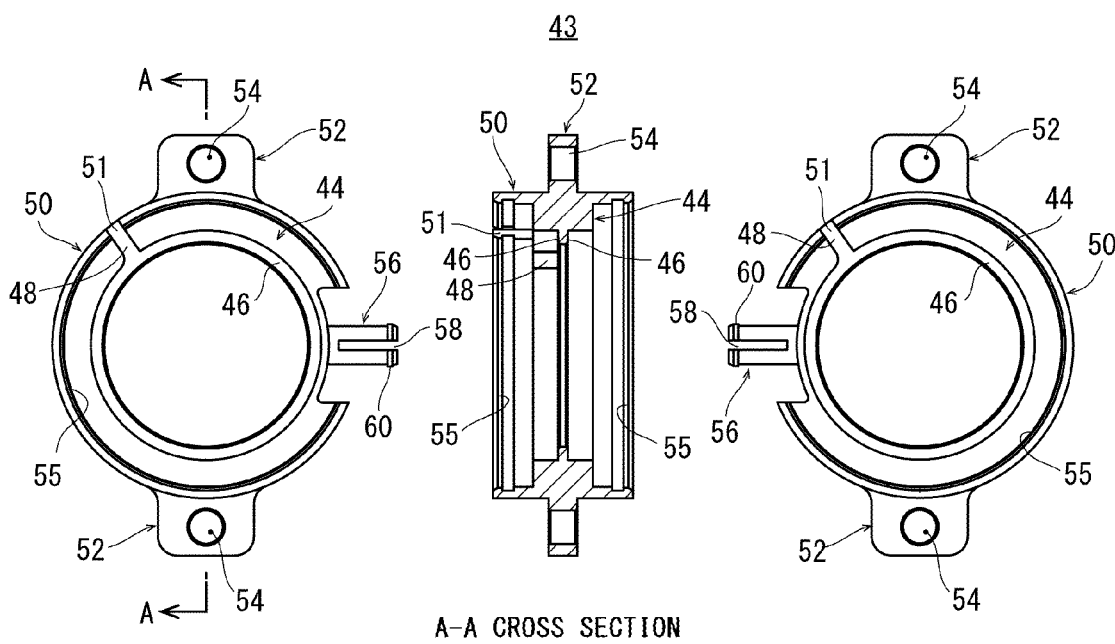
FIG. 10 shows separately a support member of the torque hinge shown in FIG. 1.

As shown in FIGS. 3 and 4, the outer ring 6 is inserted into the cylindrical support member 43 and supported thereby. As explained with reference to FIG. 10 together with FIGS. 3 to 5, the support member 43 is formed of a synthetic resin by an appropriate molding method, and it has an annularly shaped support base portion 44. The support base portion 44 has a constant radial width except for the circumferential required part. On the axial both side surfaces of the support base portion 44, a wound portion axial bearing surface 46 and a hook groove 48 are formed respectively. The annular wound portion axial bearing surface 46 is formed by reducing the axial width from both the sides along the inner peripheral edge of the support base portion 44, and the hook groove 48 linearly extends radially outward from the wound portion axial bearing surface 46. As shown in FIGS. 2 to 4, the wound portion axial bearing surface 46 and the hook groove 48 bear the wound portions 90 and the hook portions 92 of the coil springs 89 to be described later, respectively. A support outer peripheral wall 50 of substantially arcuate shape extending continuously in the circumferential direction is formed on the outer peripheral surface of the support base portion 44 except for the required angular part. At the circumferential angular position of the support outer peripheral wall 50 where the hook groove 48 is formed, a gap 51 penetrating in the radial direction is formed on the side where the hook groove 48 is formed in the axial direction (see FIG. 5). A pair of ear portions 52 extending radially outward are formed on the diametrical both sides of the outer peripheral surface of the support outer peripheral wall 50. A fixing hole 54 penetrating in the axial direction is formed in the center of each of the pair of ear portions 52. By inserting a fixing device (not shown) such as a bolt into the fixing hole 54, the support member 43 can be fixed to the driven-side member (not shown) such as a door of a vehicle. Locking ridges 55 extending in the circumferential direction are formed at the axial both side end portions on the inner peripheral surface of the support outer peripheral wall 50.

Figure 1:
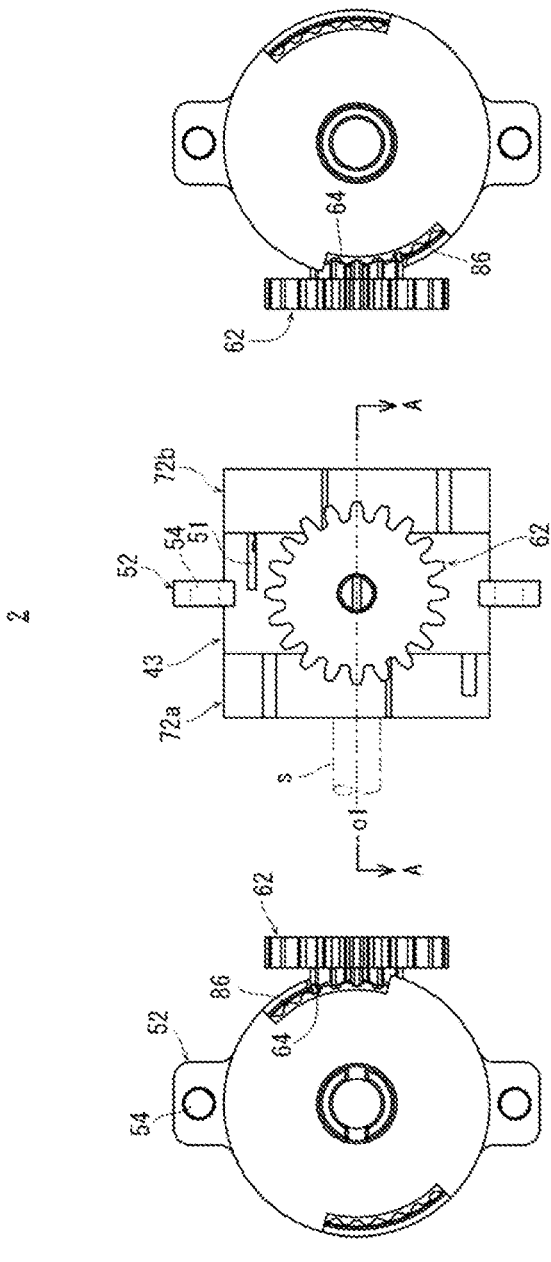
FIG. 1 is a diagram showing the entire configuration of a torque hinge configured according to the present invention.

A support shaft 56 extending in the radial direction is provided at the circumferential central position on the outer peripheral surface of the required angular part of the support base portion 44. In the illustrated embodiment, while the support shaft 56 is cylindrical as a whole, slits 58 penetrating in the diametrical direction (of the support shaft 56) are formed from the free end to the fixation end portion, and the free end portion is elastically deformable. Further, a locking projection 60 projecting radially outward (of the support shaft 56) is provided at the free end portion of the support shaft 56. As shown in FIGS. 1 and 2, the support shaft 56 is assembled with an intermediate member 62 rotatable about the support shaft 56.

Figure 11:
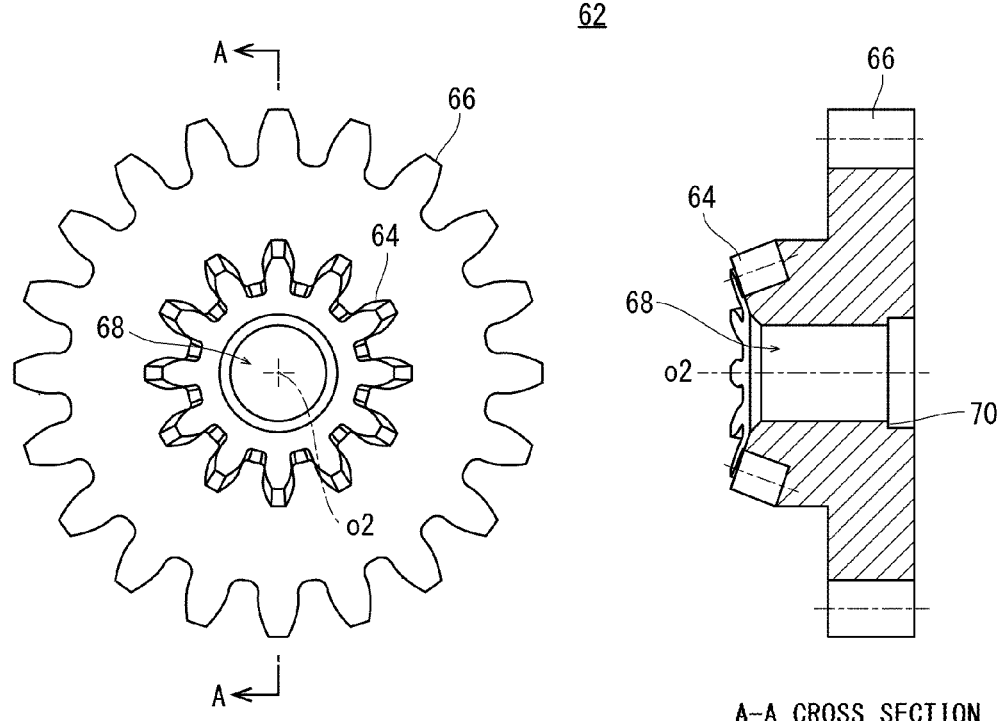
FIG. 11 shows separately an intermediate member of the torque hinge shown in FIG. 1.

The following explanation will be made by referring also to FIG. 11. The intermediate member 62 is formed of a synthetic resin by an appropriate molding method, and it has a bevel gear 64 and a spur gear 66 that rotate integrally about the support shaft 56. The bevel gear 64 and the spur gear 66 have a common central axis o2. An outer end of the bevel gear 64 extends linearly in the axial direction and is connected to a side surface of the spur gear 66. At the center of the intermediate member 62, a support shaft hole 68 extending linearly in the axial direction of the common central axis o2 is formed. At the axial end portion in the support shaft hole 68 facing the spur gear 66, a locking stepped portion 70 formed by locally enlarging the diameter is provided. As shown in FIG. 3, the intermediate member 62 is assembled rotatably with respect to the support shaft 56, since the support shaft 56 is inserted from the bevel gear 64 side of the support shaft hole 68, the locking projections 60 of the support shaft 56 pass through the locking stepped portion 70 provided in the support shaft hole 68 of the intermediate member 62, thereby elastically locking thereof. In the illustrated embodiment, the spur gear 66 is connected to an operation mechanism (not shown). The intermediate member 62 is driven to rotate about the support shaft 56 by an operation of the operation mechanism.

Figure 12:
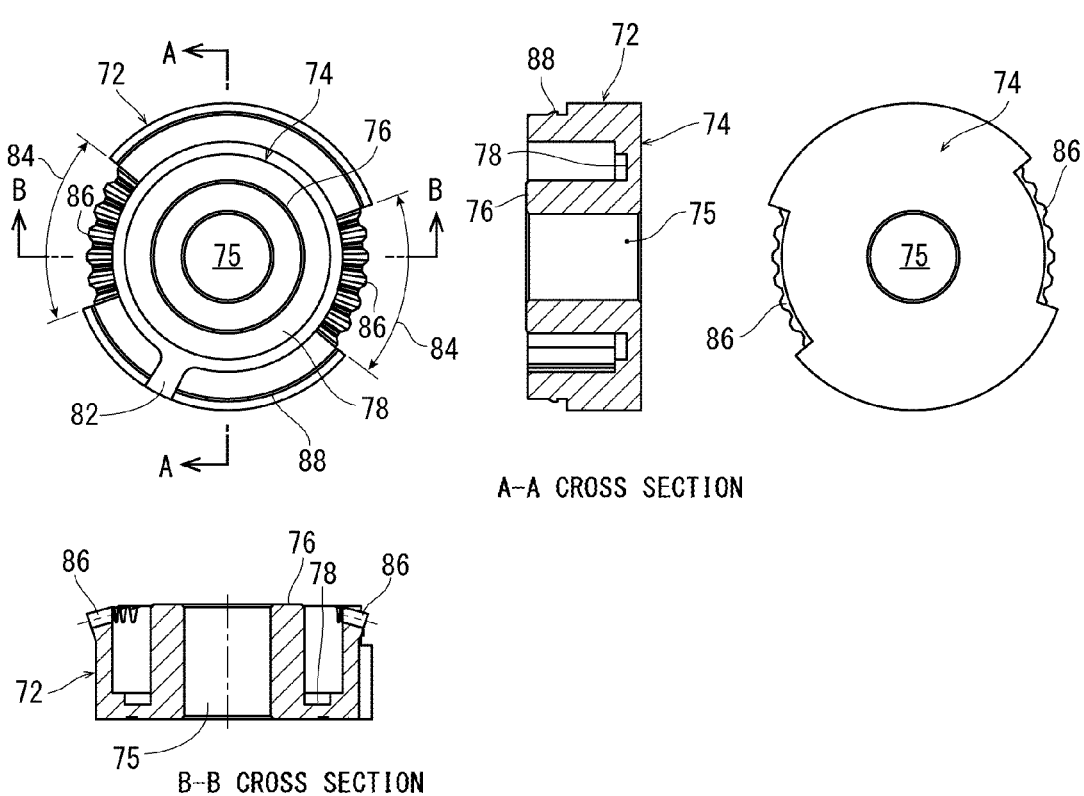
FIG. 12 shows separately a control member of the torque hinge shown in FIG. 1.

The following explanation will be made by referring to FIG. 1. Two control members 72 for controlling the coil springs 89 described later are assembled in series in the axial direction with the support member 43. In the illustrated embodiment, the control members 72 are disposed one on each axial side of the support member 43. When reference is made to each of the two control members 72, 'a' or 'b' is suffixed for distinguishment thereof. The following explanation will be made by referring to FIGS. 3 to 5 and also FIG. 12. The control members 72 each is formed of a synthetic resin by an appropriate molding method, and it has a substantially circular control base plate 74 arranged perpendicularly to the common rotational shaft o1. A circular through hole 75 is formed in the center of the control base plate 74. The control base plate 74 is provided with a cylindrical support protrusion 76 that extends in the axial direction by surrounding the outer peripheral edge of the through hole 75 and an annular outer ring bearing groove 78 that surrounds the fixation end portions of the support protrusions 76. When the control members 72 are assembled with the support member 43 as described later, as shown in FIGS. 3 and 4, the free end portion of the support protrusion 76 enters between the inner peripheral surface of the outer ring 6 and the outer peripheral surface of the inner ring 4 (more specifically, the inner ring shaft portion 16), whereby the connection member 8 and the pair of retainers 30 and 32 for retaining the same are supported from the axial both sides by the support protrusions 76 of the control members 72a and 72b disposed on the axial both sides of the support member 43. Further at this time, the inner ring 4 is rotatably supported by the support protrusions 76, while the axial end portion of the outer ring 6 is rotatably supported by the outer ring bearing groove 78. A substantially cylindrical control outer peripheral wall 80 extending in the axial direction parallel to the support projections 76 is also formed on the outer peripheral edge portion of the control base plate 74. Hook grooves 82 penetrating through the radial direction and extending linearly in the axial direction are formed at a specific angular part of the control outer peripheral wall 80. The hook grooves 82 extend over the control peripheral wall 80 in the axial direction. In the specific angular region indicated with a reference numeral 84 on the control outer peripheral wall 80, the outer diameter is slightly reduced, and arcuate racks 86 extending in the circumferential direction are provided on the axial free end surface. The specific angular regions 84 are provided one on each diametric side. As shown in FIGS. 1 and 3, since the racks 86 engage the bevel gear 64 of the intermediate member 62, the racks 86 preferably extend in the circumferential direction along the required conical surface corresponding to the conical surface on which the teeth of the bevel gear 64 are formed. Even in the free end portion of the angular region other than the specific angular region 84 on the control outer peripheral wall 80, the outer diameter is slightly reduced, and arcuate lock ridges 88 extending in the circumferential direction are formed on the outer peripheral surface.

As shown in FIG. 4, the lock ridges 88 elastically rides over the engaging ridges 55 of the support member 43 so as to be locked therewith in the axial direction, whereby the control members 72 are assembled with the support member 43. In a state in which the control members 72 are assembled with the support member 43, the control members 72 are rotatable about a common rotation axis o1 with respect to the support member 43. Further in this state, as described above, the racks 86 of the control members 72 mesh with the bevel gear 64 of the intermediate member 62 assembled with the support shaft 56 of the support member 43. In the illustrated embodiment, the two control members 72a and 72b are arranged one on each axial side of the support member 43. Therefore, the racks 86 formed on each of these two control members 72a and 72b are interconnected via the bevel gear 64, so that the two control members 72a and 72b each and the intermediate member 62 are interlocked. Therefore, if the intermediate member 62 rotates about the support shaft 56 counterclockwise in the front view of the same drawing, as it is understood by also referring to FIGS. 3 and 5, due to the meshing between the bevel gear 64 of the intermediate member 62 and the respective racks 86 of the two control members 72a and 72b, the control member 72a located on the left side in the central front view of FIG. 1 rotates clockwise (viewed from the left side of the same drawing) about the common rotation axis o1, while the control member 72b located on the right side in FIG. 1 rotates counterclockwise about the common rotation axis o1 (viewed from the same left side), namely, the rotational directions of the two control members 72a and 72b are reversed to each other. This will be described further below.

Figure 13:
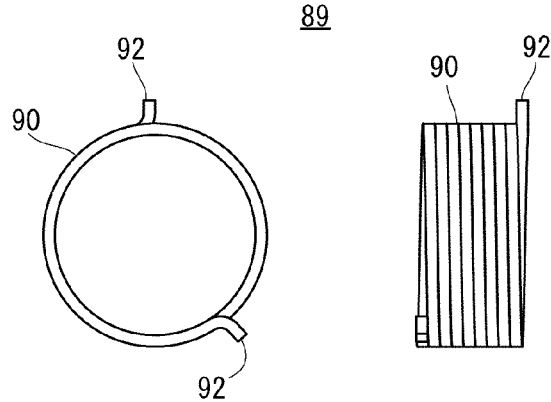
FIG. 13 shows separately a coil spring of the torque hinge shown in FIG. 1.

As shown in FIGS. 3 and 4, coil springs 89 are mounted on the outer peripheral surface of the outer ring 6. In the illustrated embodiment, the coil springs 89 are disposed one on each axial side of the support member 43. When referring to each of the two coil springs 89, 'a' or 'b' is suffixed for distinguishment thereof. The following explanation will be made by referring to FIG. 13 together with FIGS. 3 to 5. The coil springs 89 each has a wound portion 90 formed by spirally winding a metal wire having a rectangular cross section, and a pair of hook portions 92 formed by bending the wire radially outward at both axial ends of the wound portion 90. The inner diameter of the wound portion 90 is smaller than the outer diameter of the outer ring 6 when the coil spring 89 is in a free state, and the coil spring 89 is mounted on the outer peripheral surface of the outer ring 6 in a state in which the inner diameter of the wound portion 90 is temporarily expanded. As will be understood by comparing and referring to FIG. 13 and FIG. 2, when the coil spring 89 is in a free state, each of the pair of hook portions 92 is located at an angular interval of approximately 140 degrees. In a state shown in FIG. 1 (i.e., the state in which the intermediate member 62 is not operated by an operation mechanism that is not shown, as will be described later), each of the pair of hook portions 92 is located at an angular interval of approximately 180 degrees. Therefore, in a state in which the coil spring 89 is mounted on the outer peripheral surface of the outer ring 6 and no force is applied to the pair of hook portions 92, the inner peripheral surface of the wound portion 90 is in close contact with the outer peripheral surface of the outer ring 6, and the coil springs 89 tighten the outer peripheral surface of the outer ring 6 to retain it. In the illustrated embodiment, two coil springs 89a and 89b are disposed one on each axial side of the support member 43. After the outer ring 6 is inserted into the support member 43 and before the control member 72 is assembled with the support member 43, the two coil springs 89a and

89b are mounted on the outer ring 6 one from each axial side, and the pair of hook portions 92 each is fitted into each of the hook grooves 48 and 82 formed on the support member 43 and on the control member 72. At this time, for instance, the winding direction of the wires constituting the two coil springs 89a and 89b may be reversed to each other when viewed from one end in the axial direction. The reason will be described later.

Next, the actions of the torque hinge 2 will be explained. In the state as shown in FIG. 1, the operation mechanism (not shown), which is connected to the spur gear 66 of the intermediate member 62 in order to rotate and drive the member 62, is not actuated. Therefore, each of the two coil springs 89a and 89b arranged on the axial both sides of the support member 43 tightens and retains the outer peripheral surface of the outer ring 6. When the rotation torque is applied from the shaft member s to the inner ring 4 in this state, the inner ring 4 and the support member 43 rotate integrally since the inner ring 4 is connected to the outer ring 6 by the required frictional force applied by the connection member 8. Alternatively, the inner ring 4 and the support member 43 rotate relatively since the inner ring 4 slides with respect to the outer ring 6 against the required frictional force applied by the connection member 8.

When rotation torque is applied to the inner ring 4, the outer ring 6 connected to the inner ring 4 by the connection member 8 tries to rotate in the same direction as the rotation direction of the inner ring 4. In the illustrated embodiment, the winding direction of the wires constituting the two coil springs 89a and 89b arranged on the axial both sides of the support member 43 are opposite to each other when viewed from one end in the axial direction. Therefore, when the inner ring 4 rotates clockwise when viewed from the left side in FIGS. 3 and 4 for instance, as can be understood by referring also to FIG. 5, one of the pair of hook portions 92 of the coil spring 89a mounted on the outer ring 6, namely, a hook portion 92 that is fitted into the hook groove 48 formed in the support member 43, is pressed by the support member 43 in the direction to loosen the spring, in the hook groove 48 formed in the support member 43. On the other hand, the other hook portion 92 of the coil spring 89b mounted on the outer ring 6, namely, the hook portion 92 fitted into the hook groove 48 formed on the support member 43, is pressed by the support member 43 in the direction to tighten the spring in the hook groove 48 formed on the support member 43. If the inner ring 4 rotates in the opposite direction, the situation is reversed. That is, regardless of the rotational direction of the inner ring 4, since either one of the hook portions 92 of the two coil springs 89a and 89b is pressed in a direction to tighten the spring at all times, the outer ring 6 is sufficiently reliably retained by the coil spring 89. As a result, in a case where a single coil spring 89 is mounted on the outer peripheral surface of the outer ring 6, or in a case where two coil springs 89 whose winding directions of the wires are the same when viewed from one end in the axial direction are mounted on the outer peripheral surface of the outer ring 6, when the outer ring 6 tries to rotate in the same direction as the rotation direction of the inner ring 4 by the rotation torque applied to the inner ring 4, even if any one of the pair of hook portions 92 of the coil springs 89 is pressed by the support member 43 in the direction for loosening the spring, it is necessary to limit the magnitude of the input torque in the range for allowing the coil spring 89 to retain the outer ring 6.

Figure 14:
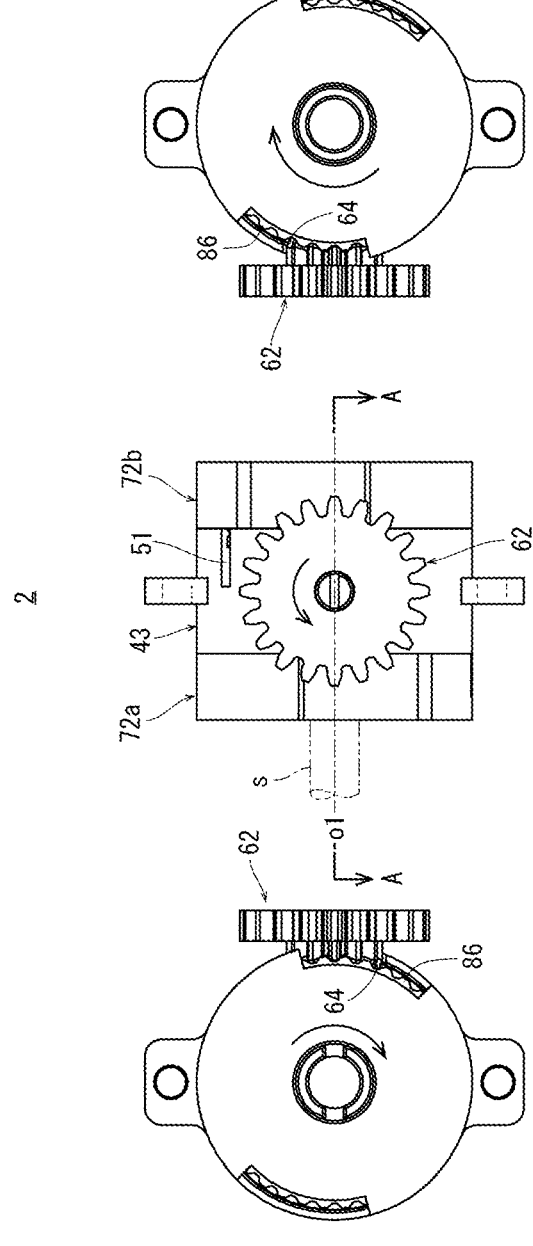
FIG. 14 is a diagram showing a state of operating the intermediate member in the torque hinge shown in FIG. 1.
Figure 15:
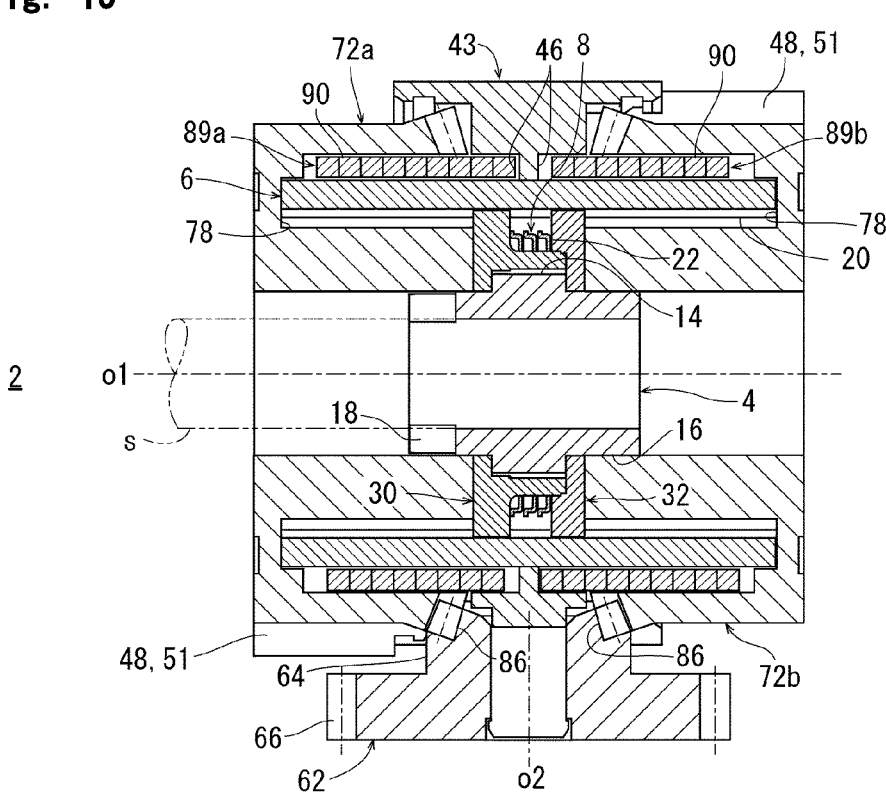
FIG. 15 is a cross-sectional view showing the components of FIG. 14 along a section line A-A.

When the intermediate member 62 is driven to rotate counterclockwise about the support shaft 56 in the central front view of FIG. 1 by an operation mechanism (not shown)

from the state shown in FIG. 1, the control member 72 equipped with the racks 86 meshing with the bevel gear 64 of the intermediate member 62 rotates about the common rotation axis o1 with respect to the support member 43, and presses the hook portions 92 of a coil spring 89 fitted into the hook grooves 82 of the control member 72 in a direction to loosen the coil spring 89. In the illustrated embodiment, both the control members 72 and the coil springs 89 are arranged one on each axial side of the support member 43. The wires constituting the two coil springs 89*a* and 89*b* arranged on the axial both sides of the support member 43 are wound in the directions opposite to each other when viewed from one end in the axial direction. Since the two control members 72*a* and 72*b* rotate in the directions opposite to each other as mentioned above, the hook portions 92 of the two coil springs 89*a* and 89*b* are pressed at the same time in the direction to loosen the coil springs 89. FIG. 14 shows a state in which the intermediate member 62 is stopped after being rotated by the required angle counterclockwise by the operation mechanism. The intermediate member 62 is retained by the operation mechanism in the angular position shown in FIG. 14. As will be appreciated by comparing and referring to the left view of FIG. 1 with the left view of FIG. 14, the control member 72*a* is rotated clockwise about the common rotation axis o1 in the left views. Meanwhile, as will be appreciated by comparing and referring to the right view of FIG. 1 and the right view of FIG. 14, the control member 72*b* is also rotated clockwise about the common rotation axis o1 in the right views. The rotational directions of the control members 72*a* and 72*b* in the drawings are the same, but as described above, their rotational directions are opposite to each other when viewed from one end in the axial direction. In the state shown in FIG. 14, as shown in FIG. 15, the coil springs 89*a* and 89*b* liberate the outer ring 6, and the outer ring 6 is rotatable with respect to the coil springs 89*a* and 89*b*. That is, in a case where the rotational torque is applied around the common rotation axis o1 to the support member 43, since the support member 43 (and the control member 72*a* and 72*b* to be assembled therewith) is rotatable with respect to the outer ring 6, the inner ring 4 and the support member 43 are relatively rotatable regardless of the required frictional force applied by the connection member 8. In FIG. 15, the inner peripheral surface of the wound portions 90 of the coil springs 89*a* and 89*b* are completely separated from the outer peripheral surface of the outer ring 6. However, if the outer ring 6 is rotatable with respect to the coil springs 89*a* and 89*b*, the inner peripheral surfaces of the wound portions 90 of the coil springs 89*a* and 89*b* may not necessarily be completely separated from the outer peripheral surface of the outer ring 6, respectively. Both the surfaces may be in contact with each other.

As for the torque hinge of the present invention, the pair of hook portions 92 of each coil spring 89 mounted on the outer peripheral surface of the outer ring 6 are fitted into hook grooves 48 and 82 formed respectively in the support member 43 for supporting the outer ring 6 and the control members 72 assembled with the support member 43 in series in the axial direction. The control members 72 are rotatable about a common rotation axis o1 of the inner ring 4 and the outer ring 6 with respect to the support member 43. Therefore, by relatively rotating the support member 43 and the control members 72 about the common rotation axis o1, it is possible to switch between a state in which the coil springs 89 tighten and retain the outer ring 6, and a state in which the coil springs 89 liberate the outer ring 6.

Therefore, in a state in which the coil springs 89 tighten and retain the outer ring 6, the support member 43 is integrated with the outer ring 6. As a result, the inner ring 4 connected to the outer ring 6 by the required frictional force applied by the connection member 8 becomes rotatable with the support member 8 integrally or relatively against the required frictional force. On the other hand, in a state in which the coil springs 89 liberate the outer ring 6, the support member 43 is separated from the outer ring 6 and becomes rotatable with respect thereto with a sufficiently small force, and thus, the inner ring 4 becomes also rotatable with respect to the support member 43 with a sufficiently small force. In other words, by using the torque hinge of the present invention, it is possible to switch between states, i.e., a state of rotating two members connected to both the sides integrally or relatively against the required frictional force by performing a required operation, and a state of relatively rotating with a sufficiently small force without depending on the required frictional force. Therefore, if the torque hinge of the present invention is assembled in a vehicle door for instance as a rotation transmitter while the inner ring 4 and the support member 43 are connected to the electric motor and the door respectively, the electric motor is capable of opening/closing the door against the required frictional force by the connection member 8 in a state in which the coil springs 89 retain the outer ring 6. In the meantime, the door may be subjected suddenly to an external force by wind or the like when the door is in an opening/closing operation by the driving torque of the electric motor or when the door is retained at the full-open position or the intermediate open position by the detent torque or the retaining torque of the electric motor. In such a case, the external force applied to the door can be released by the relative rotation of the inner ring 4 and the outer ring 6, thereby preventing flapping of the door. On the other hand, in a state in which the coil springs 89 liberate the outer ring 6, the door can be opened and closed with a sufficient small force even if the inner ring 4 is connected to the electric motor.

Though the torque hinge configured according to the present invention has been described above in detail with reference to the attached drawings, the present invention is not limited to the above-described embodiments, and appropriate modifications and changes can be made without departing from the present invention. In the illustrated embodiment, the inner peripheral surface of a wound portion 90 is in close contact with the outer peripheral surface of the outer ring 6 in a state in which the coil springs 89 are mounted on the outer peripheral surface of the outer ring 6 and no force is applied to the pair of hook portions 92, where the control members 72 rotate about the common rotation axis o1 such that the coil springs 89 liberate the outer ring 6. According to a desired configuration, the inner peripheral surface of the wound portion is separated from the outer peripheral surface of the outer ring 6 in a state in which the coil spring is mounted on the outer peripheral surface of the outer ring 6 and no force is applied to the pair of hook portions, and the control members 72 rotate about the common rotation axis o1 so that the coil springs tighten and retain the outer ring 6. Further, in the illustrated embodiment, the control members 72 are driven by operating the intermediate member 62 with an operation mechanism (not shown). It is also possible to directly connect the control members 72 by an appropriate connection method and to directly operate the control members 72 by the operation mechanism. In this case, as mentioned above, the two control members 72*a* and 72*b* are connected by the respective racks 86 and the bevel gear 64 of the intermediate member 62, and interlocked. Therefore, if any one of the two control members 72*a* and 72*b* is operated directly by the operation mechanism, the other may be driven by the control member that is driven by the operation mechanism. Further, the connection member is disposed between the inner ring 4 and the outer ring 6 so that the rings may be connected disconnectably by the required frictional force, and thus, a coil spring, a so-called ring spring, or a tolerance ring can be employed as the connection member as described in the above Patent Documents.

EXPLANATIONS OF LETTERS OR NUMERALS

2: torque hinge
4: inner ring
6: outer ring
8: connection member
30 and 32: retainers
43: support member
48: hook groove (of support member)
56: support shaft
62: intermediate member
64: bevel gear
72 (72a and 72b): control member
82: hook groove (of control member)
86: rack
89 (89a and 89b): coil springs
92: hook portion
The invention claimed is:

1. A torque hinge comprising an inner ring and an outer ring that have a common rotation axis, and a connection member disposed between the inner ring and the outer ring so as to selectively connect/disconnect the inner ring and the outer ring by a required frictional force, the inner ring and the outer ring being rotatable integrally or relatively against the required frictional force, wherein the outer ring is inserted into a cylindrical support member so as to be supported by the cylindrical support member, and coil springs each having a pair of hook portions are mounted on an outer peripheral surface of the outer ring, a plurality of control members for controlling the coil springs are assembled in series in an axial direction with the cylindrical support member, the control members being rotatable about the common rotation axis with respect to the cylindrical support member, and the cylindrical support member having hook grooves into which one of the pair of hook portions of each of the coil springs is to be fitted and the control members each having a hook groove into which another one the pair of hook portions of a respective one the coil springs is to be fitted, and the coil springs retain or liberate the outer ring by a required operation.

2. The torque hinge according to claim 1, wherein the coil springs and the control members are arranged one on each of axial sides of the cylindrical support member, the cylindrical support member is assembled with a bevel gear that is rotatable about a support shaft perpendicular to the common rotation axis, and the control members are equipped with arcuate racks extending in a circumferential direction to mesh with the bevel gear.

3. The torque hinge according to claim 2, wherein the coil springs arranged on the axial both sides of the cylindrical support member are composed of wires that are wound in directions opposite to each other when viewed from one axial end.

4. The torque hinge according to claim 2, wherein each of the control members has a cylindrical support protrusion to enter between an inner peripheral surface of the outer ring and an outer peripheral surface of the inner ring, and the connection member is supported from axial sides by the cylindrical support protrusions of the control members arranged on the axial sides of the cylindrical support member.

5. The torque hinge according to claim 1, wherein the coil springs tighten and retain the outer ring in a state in which the coil springs are mounted on the outer peripheral surface of the outer ring and no force is applied to each of the pairs of hook portions, and the control members rotate with respect to the cylindrical support member so that the coil springs liberate the outer ring.

6. The torque hinge according to claim 1, wherein the connection member is non-rotatable with respect to the outer ring.

7. The torque hinge according to claim 6, wherein the connection member is retained from axial sides by a pair of retainers, and each of the pair of retainers is locked with the outer ring in a circumferential direction by a circumferential locking means.

8. The torque hinge according to claim 6, wherein the connection member is a spring member including a metal thin plate having spring portions to be in close contact with an outer peripheral surface of the inner ring.

* * * * *